(12) United States Patent
Sano et al.

(10) Patent No.: US 6,538,227 B1
(45) Date of Patent: Mar. 25, 2003

(54) ELECTRIC DISCHARGE MACHINE HAVING A BALANCE DEVICE FOR BALANCING GRAVITATIONAL FORCE ACTING ON A VERTICALLY MOVEABLE QUILL

(75) Inventors: Sadao Sano, Kanagawa (JP); Akio Hosaka, Fukui (JP)

(73) Assignees: Sodick Co., Ltd., Kanagawa (JP); KHS Co., Ltd., Kanagawa (JP)

( * ) Notice: Subject to any disclaimer, the term of this patent is extended or adjusted under 35 U.S.C. 154(b) by 0 days.

(21) Appl. No.: 09/600,977
(22) PCT Filed: Dec. 2, 1999
(86) PCT No.: PCT/JP99/06744
§ 371 (c)(1), (2), (4) Date: Oct. 24, 2001
(87) PCT Pub. No.: WO00/32343
PCT Pub. Date: Jun. 8, 2000

(30) Foreign Application Priority Data

Dec. 2, 1998 (JP) .............................. 10/343195
May 25, 1999 (JP) .......................... 11/144197

(51) Int. Cl.⁷ ................................................. B23H 7/30
(52) U.S. Cl. .................................................... 219/69.2
(58) Field of Search .............. 219/69.11, 69.2, 219/69.15

(56) References Cited

U.S. PATENT DOCUMENTS 5,688,084 A  11/1997  Fritz et al.
6,326,576 B1 * 12/2001 Krenz et al. ............. 219/69.11
6,353,199 B1 *  3/2002 Hosaka et al. ............ 219/69.2
6,369,343 B1 *  4/2002 Krenz et al. ............... 219/69.2

FOREIGN PATENT DOCUMENTS

| JP | 63-200904 | 8/1988 |
| JP | 5-104332 | 4/1993 |
| JP | 8-309620 | 11/1996 |
| JP | 9-262727 | 10/1997 |

* cited by examiner

Primary Examiner—Geoffrey S. Evans
(74) Attorney, Agent, or Firm—McDermott, Will & Emery; Paul Devinsky

(57) ABSTRACT

An electric discharge machine having an electrode mounting device (42) for mounting a tool electrode, a quill (41) movable in the vertical direction and having the tool mounting device attached to a lower end, at least two linear motor movers (43, 44) attached to the quill and disposed symmetrically about the central axis of the quill, at least two linear motor stators (31, 32), each disposed opposite one of the at least two movers, and a balance device (6) for balancing a gravitational force acting on the quill. The balance device has an air cylinder (60) arranged coaxially with the quill so that a balance force having a force vector aligned with the central axis of the quill is generated. The air cylinder is preferably mounted in a hole formed in the center of the quill and extends in a vertical direction.

16 Claims, 9 Drawing Sheets

F I G. 5
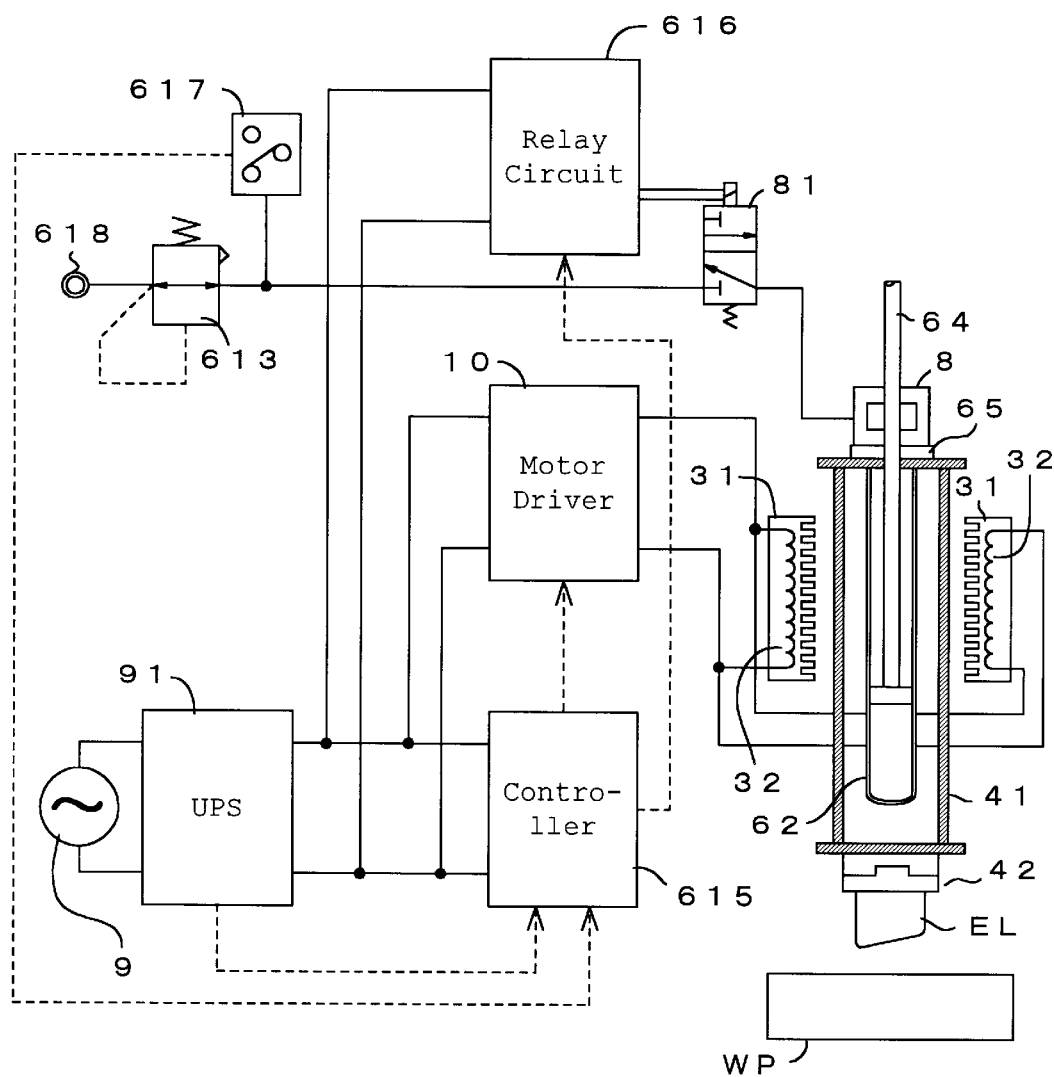

ELECTRIC DISCHARGE MACHINE HAVING A BALANCE DEVICE FOR BALANCING GRAVITATIONAL FORCE ACTING ON A VERTICALLY MOVEABLE QUILL

FIELD OF THE INVENTION

The present invention relates to an electric discharge machine for forming holes of desired shapes in a workpiece while repeatedly causing electric discharges to occur between a tool electrode and a conductive workpiece, while moving the tool electrode towards the workpiece. More particularly, the present invention relates to an electric discharge machine having a balance device for balancing gravitational force acting on a vertically moveable quill.

BACKGROUND OF THE INVENTION

Electric discharge machines are widely used to accurately process solid conductive workpieces into molds and dies. The workpiece is fixed to a table arranged in a work tank, and a tool electrode of copper or graphite is attached to a quill, which is movable in a vertical direction, using a suitable electrode mounting device. The work tank is filled with dielectric fluid, such as kerosene, and the tool electrode is positioned extremely close to the workpiece. The space between the workpiece and the tool electrode is referred to as a "gap", also known as the "machining gap"; the size of this gap ranges from a few $\mu$m to a few tens of $\mu$m. By applying a power pulse across the workpiece and the tool electrode during a controlled pulse ON time, the insulation characteristics of the dielectric fluid in the gap are broken down and a discharge is produced. Microscopic amounts of the workpiece material are evaporated or made molten by the heat caused by this discharge, and flow into the dielectric fluid. When the pulse ON time is completed, i.e., during the pulse OFF time, the insulation characteristics of the dielectric in the gap are restored.

As a result of the discharges produced during the pulse ON time, microscopic crater shaped holes remain on the surface of the workpiece. At the completion of the pulse ON time, a controlled OFF time starts during which application of a power pulse to the workpiece is interrupted and the insulation characteristics of the dielectric fluid in the gap may be restored. Electric discharge machines usually have the ON time and OFF time controlled in a range of between about 1 $\mu$sec and a few tens of msecs, to thereby apply a train of power pulses to the gap.

During machining the electric discharge machine causes the tool electrode to move toward the workpiece, along the Z axis, in order to maintain the gap at a relatively fixed size. As tool electrode advances, removing microscopic amounts of material from the workpiece without contacting the workpiece, cavaties. complementary in shape to the tool electrode are accurately formed in the workpiece. The cavities have good surface roughness characteristics. This type of electric discharge machine, known as a sinker EDM is classified differently than a wire EDM, i.e., a machine which uses a moving wire electrode.

Use of an appropriate flushing procedure to produce a flow of dielectric fluid through the gap to wash fragments removed from the workpiece away from the gap is important in electric discharge machines. The flushing procedure serves to prevent undesired secondary discharges between the tool electrode and fragments that have been removed from the workpiece, and to restore reliable insulation during the pulse OFF time. A skilled operator may form holes at appropriate positions in the sinker tool electrode and the workpiece (before processing) in order to supply fresh dielectric into the gap and to suck contaminated dielectric fluid out of the gap. When the shape of these machining fluid circulation holes is limited due to the size and shape of the tool electrode, the operator may arrange an injection apparatus for injecting dielectric fluid towards the gap at an appropriate position. Flushing is crucial to carrying out good discharge machining faster and more accurately, but skill is necessary in order to produce a uniform flow throughout the entire gap. Causing the tool electrode to move periodically along the Z axis, first to rapidly rise up and then to rapidly fall, so that the contaminated dielectric fluid in the gap is almost completely removed from the cavities in the workpiece, is known as a "jump" operation. During a conventional jump operation, the tool electrode moves at a rate of a few hundred mm/min. As the reciprocating distance of the tool electrode is made larger, more fresh fluid flows into the gap and more contaminated fluid is ejected from the gap. Therefore, the tool electrode is preferably caused to rise up during a jump operation to at least the depth of a cavity being formed in the workpiece. However, since there is no removal of material from the workpiece during a jump operation, if jump operations are carried out too frequently, it results in a lowering of the stock removal rate. In order to perform a jump operation having a sufficiently large amount of movement without lowering the stock removal rate, the tool electrode is preferably moved with an acceleration and deceleration in excess of 1 G.

DISCLOSURE OF THE INVENTION

An object of the present invention is to provide an electric discharge machine that has, in addition to a quill movable in the vertical direction with high acceleration, a balancing device for balancing gravitational forces acting on the vertically moveable quill.

Another object of the present invention is to provide an electric discharge machine that causes a quill, having a tool mounting electrode attached to a lower end thereof, to move accurately in the vertical direction with high acceleration.

Additional objects, advantages and novel features of the invention will be set forth in the description that follows, and will become apparent to those skilled in the art upon reading this description or practicing the invention. The objects and advantages of the invention may be realized and attained by practicing the invention as recited in the appended claims.

In order to achieve the above and other objects, there is provided an electric discharge machine (EDM) according to the present invention for machining a workpiece by moving a tool electrode vertically towards a workpiece while repeatedly producing electric discharges between the workpiece and the tool electrode. The EDM comprises a vertically movable quill, an electrode mounting device attached to a lower end of the quill for mounting the tool electrode, at least two linear motor movers attached to the quill symmetrically about the central axis of the quill, at least two linear motor stators, respectively opposite the at least two movers, and a balance device for balancing a gravitational force acting on the quill so that a line of action of a balance force can be aligned with the central axis of the quill.

Preferably, the balance device comprises an air cylinder arranged coaxially with the quill.

More preferably, the quill has a hole extending vertically in the center and the air cylinder is located in the hole.

BRIEF DESCRIPTION OF THE DRAWINGS

FIG. 5 is a drawing showing the brake assembly of FIG. 1.

PREFERRED EMBODIMENT OF THE INVENTION

An example of an electric discharge machine 1 according to the present invention will now be described with reference to FIG. 1, FIG. 2, FIG. 3 and FIG. 4.

Figure 1:
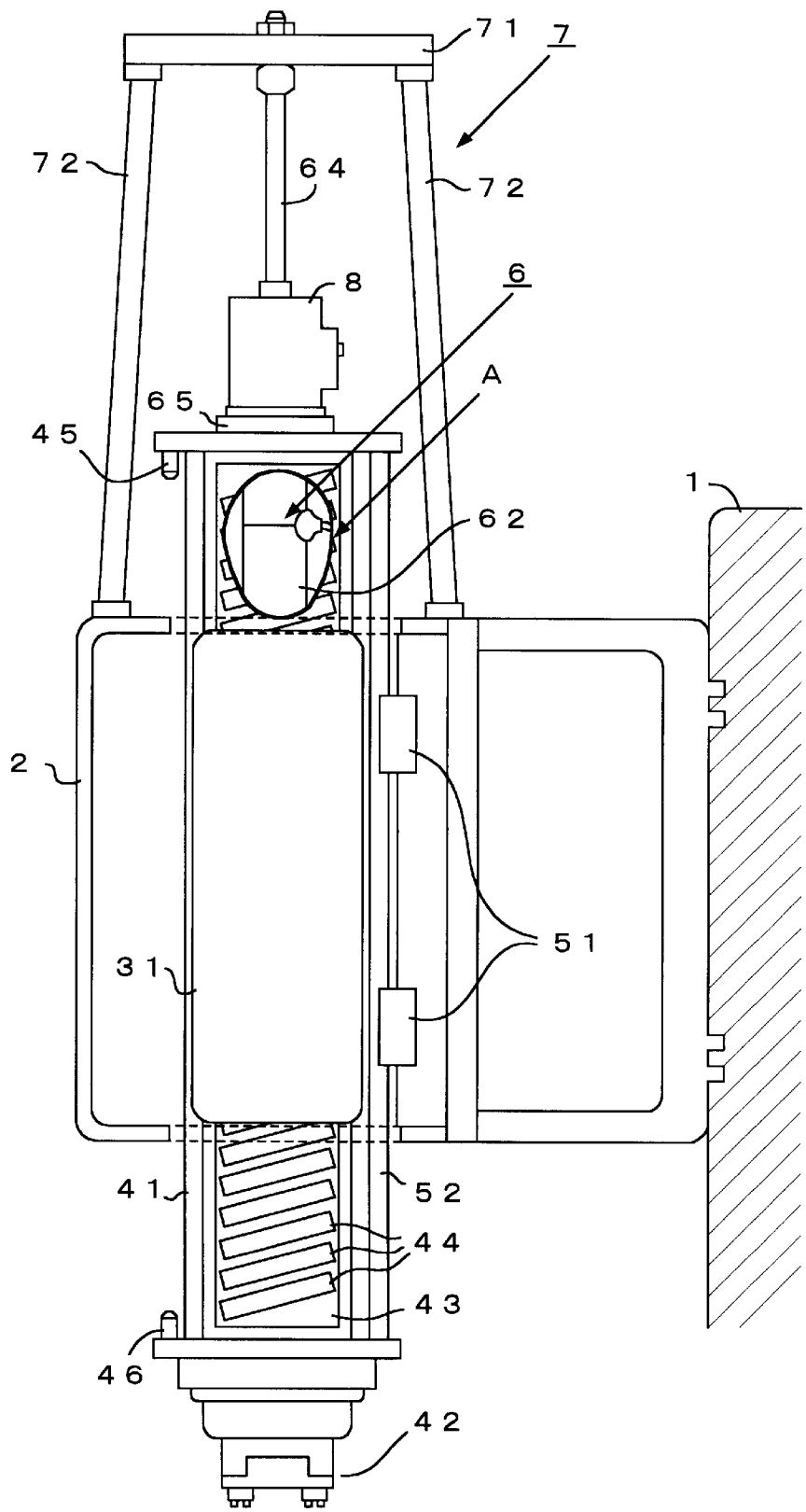
FIG. 1 is a side view illustrating a first embodiment of an electric machining discharge apparatus of the present invention.
Figure 2:
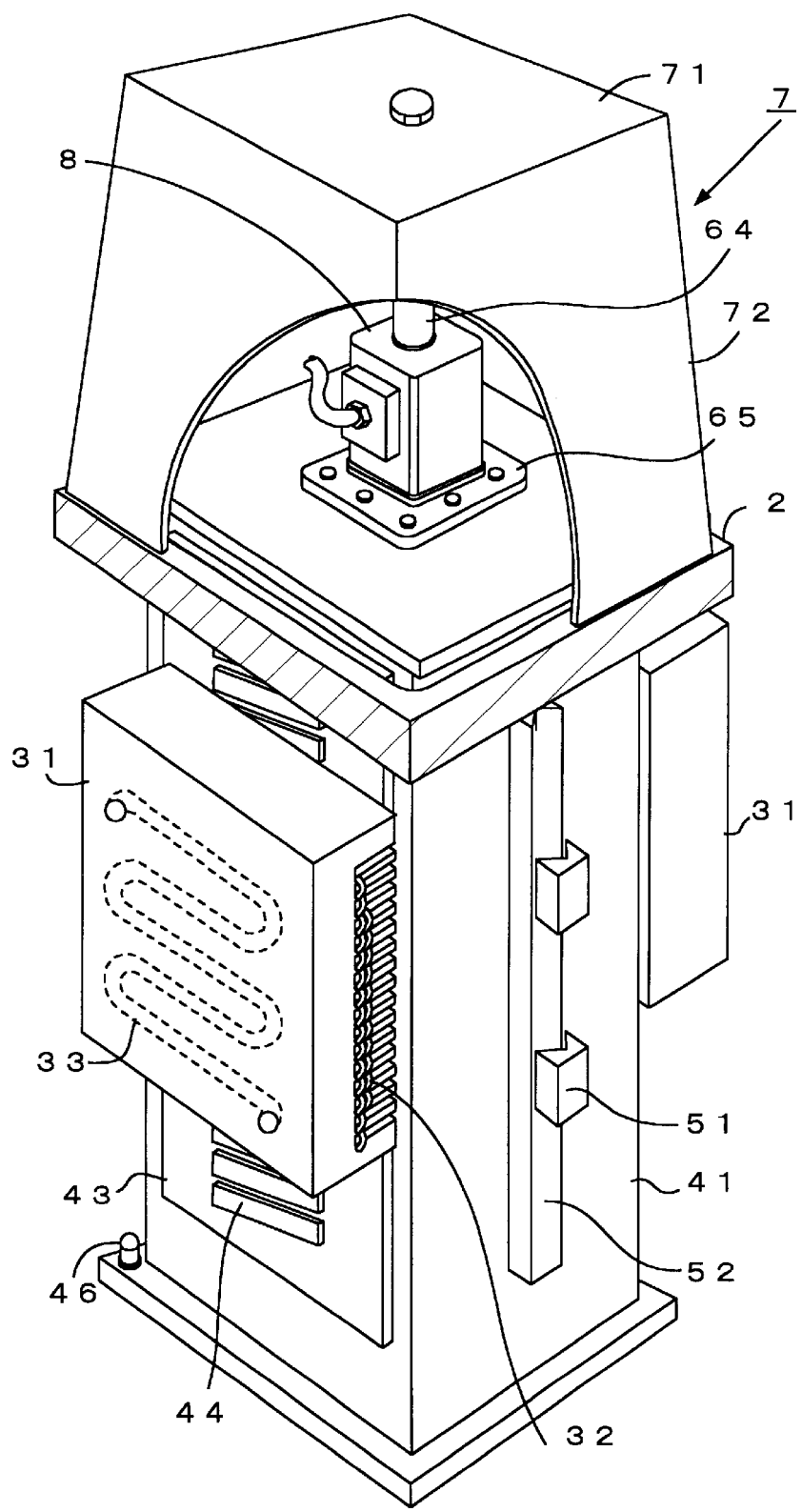
FIG. 2 is a perspective drawing illustrating the electric discharge machining apparatus of FIG. 1.

As shown in FIG. 1, an electrode mounting device 42 (not shown in the drawings) to which a tool electrode is attached, is fixed to a lower end of a quill 41 and arranged coaxially with the quill 41. The quill 41, which preferably has a square columnar shape, also preferably has a cylindrical hole extending vertically through its center. The quill 41 is movable at high speed in the vertical direction along the Z axis by means of two linear motors. In the illustrated embodiment, a linear motor mover (rotor) comprises permanent magnets 44 and a magnetic plate 43, while a linear motor stator comprises a yoke 31 and an armature coil 32. The magnetic plate 43, on which a single row of permanent magnets 44 are arranged, is fixed to parallel side walls opposite to the quill 41 and is disposed symmetrically with respect to the permanent magnets 44. The permanent magnets 44 are respectively fastened to the magnetic plate 43 and are preferably inclined slightly from the horizontal direction so as to cause a reduction in torque ripple. A column 1 of the electric discharge machining apparatus is located above a bed (not shown) and a frame 2 is attached to the column 1. The yoke 31 around which the armature coil 32 is wound is fixed to the frame 2 so as to be opposite the row of permanent magnets 44. The gap between the mover and the stator is maintained at such a size that a center of thrust generated at both side surfaces opposite to the quill 41 is aligned with the central axis of the quill 41. A coolant pipeline 33 is formed in the yoke 31. If current flows in the armature coil 32, the quill 41 moves in the vertical direction by means of the force generated between the mover and the stator. Stoppers 45 and 46 for determining the limit of travel of the quill 41 are respectively provided on upper and lower ends of the quill 41. The stoppers 45 and 46 preferably contain resilient members for absorbing shock when they respectively collide with the frame 2. The quill 41 is guided by a guide assembly comprising a guide rail 52 and a pair of linear motor roller bearings 51. The guide rail 52 is provided on the inner surface of the quill 41 that is not provided with the mover. The pair of linear motor roller bearings 51 are provided on the frame 2 and engage with the guide rail 52.

A balance mechanism 6 for balancing a load of a moving body capable of moving in the vertical direction at a speed in excess of 1 G comprises an air cylinder 60 and an air supply 61. The air supply 61 contains a cylinder 62 located in a hole of the quill 41 coaxial with the quill 41, a piston 63 capable of reciprocally sliding inside the cylinder, and a piston rod 64 having one end linked to the piston 63. A flange 65 of the cylinder 62 is rigidly fixed to an upper end of the quill 41 by bolts. The piston rod 64 is supported at its other end by a bracket 7. The bracket 7 comprises a top plate 71 fixed to the other end of the piston rod 64 and a side wall 72 for supporting the top plate 71. The side wall 72 is fixed to the frame 2. Because the cylinder 62 is provided directly next to the quill 8, the air cylinder 60 very responsively tracks movement of the quill 41.

Figure 3:
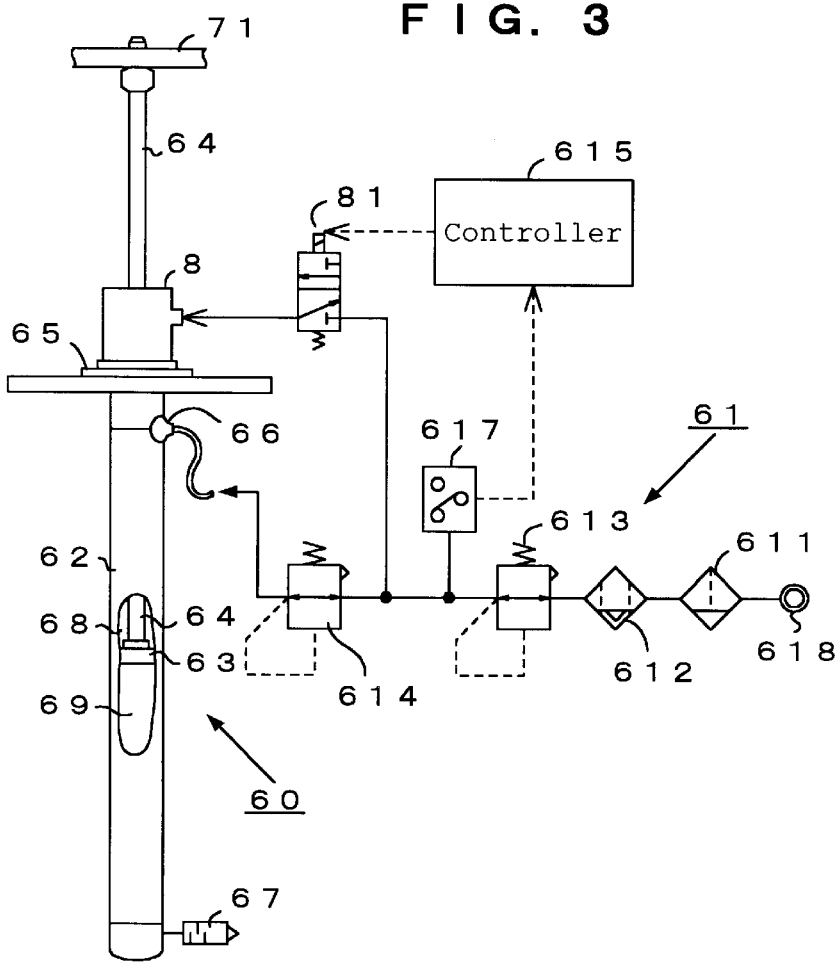
FIG. 3 is an air circuit diagram of a balance device in FIG. 1.

The air supply 61 will now be described in detail with reference to FIG. 3.

A supply port 66 for either supplying air to or discharging air from an upper chamber 68 formed inside the cylinder 62 at a location higher than the piston 63. The amount of air inside the upper chamber 68 is controlled in response to the position of the quill 41 so as to maintain the air pressure inside the upper chamber 68 at a fixed value. A lower chamber 69 is formed in the cylinder 62 at a location lower down than the piston 63, communicates with a silencer 67 and opens out to the atmosphere. The air supply 61 controls the air cylinder 60 to maintain the pressure of compressed air supplied from a compressed air supply 618, such as a compressor, at a set value. The air supply 61 contains a filter 611 for removing dirt and dust from the compressed air, a filter 612 for further removing oil mist from the compressed air, and an air regulator 613 for adjusting the compressed air to be supplied at a specified pressure. The air supply 61 also has a high relief air regulator 614 for maintaining the air pressure inside the upper chamber 68 at the set value by supplying and discharging air to and from the upper chamber 68 at high speed. The high relief air regulator 614 may actually comprise a large capacity air regulator provided with a large capacity relief valve. If the air pressure inside the upper chamber 68 becomes higher than the set value due to lowering of the quill 41, the high relief air regulator 614 opens the relief valve and discharges air inside the upper chamber 68 from the supply port 66 at high speed. If the air pressure inside the upper chamber 68 becomes lower than the set value due to raising of the quill 41, the high relief air regulator 614 supplies air into the upper chamber 68 from the supply port 66 at high speed with the relief valve closed. The air pressure inside the upper chamber 68 is set so as to generate a balance force to counteract the gravitational force acting on the quill 41 primarily due to the mass of the quill 41, the linear motor mover, the electrode mounting device 42 and the tool electrode. This set value can be easily varied using, e.g., a button (not shown) provided on the high relief air regulator 614. The air pressure is set depending on the weight of the tool electrode attached to the machine, for example in the range 2.5–6 kg/cm$^2$. To make it easy for the operator to set the air pressure, the air pressure scale preferably indicates the weight of the tool electrode.

As a result of the balance device 6, the weight of the moving body, primarily including the quill 41, linear motor movers, electrode mounting device and tool electrode, does not impose any load on the linear motor, and therefore electric power is conserved while the quill 41 is stationary. Also, the balance device 6 reduces the output of the linear motor, which means that generation of heat from the linear motor is minimized and the mover of the linear motor may be made lightweight. Making the moving body lightweight contributes to the high overall acceleration of the moving body. Since the cylinder 62 and the quill 41 are arranged coaxially, a line of action of a balance force generated in the air cylinder 60 is aligned with the central axis of the quill 41. The line of action of the balance force is also aligned with the center of thrust generated by the linear motor. Accordingly, no bending moment acts on the quill 41 or the air cylinder 61, thereby ensuring the quill 41 will move in a straight line.

Figure 4:
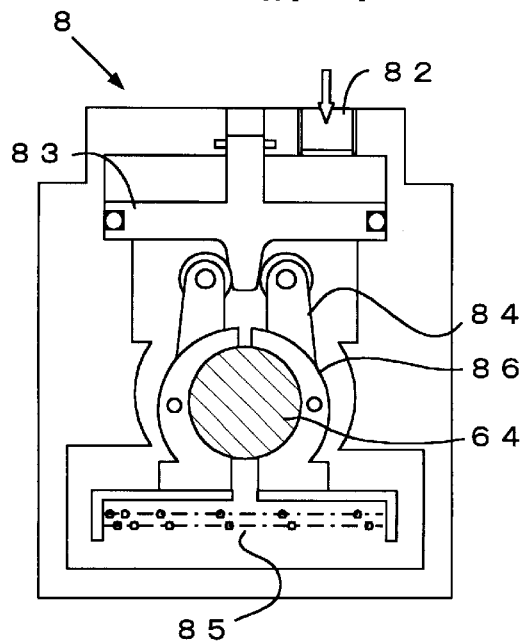
FIG. 4 is a cross sectional drawing illustrating a brake assembly in FIG. 1.

A brake assembly is provided on the flange 65 for preventing the workpiece and the tool electrode from colliding if the tool electrode unexpectedly drops. As shown in FIG. 4, a push member 83 opens a pair of levers 84 using compressed air supplied to the brake assembly 8 from a port 82. In this state, the levers 84 and a pair of integral brake shoes 86 oppose the resilient force of an armature coil spring 85, to open a piston rod 64 penetrating through the brake assembly 8. As shown in FIG. 5, compressed air is conveyed from the compressed air supply 618, through an electromagnetic valve 81 to the brake assembly 8.

Referring to FIG. 5, operation of the brake assembly 8 when an electricity failure occurs will be described. Reference characters EL and WP respectively represent a tool electrode and a workpiece. An uninterruptible power supply 91, e.g., a battery supplies electrical power to a controller 615, a motor driver 10, and a relay circuit 616 as soon as an electricity failure is detected. The uninterruptible power supply 91 is continuously charged using an a/c power source 9. If a signal indicating an electricity failure is received from the uninterruptible power supply 91, the controller 615 transmits a signal to the motor driver 10 to cause the quill 41 to be raised or to be lowered by a specified distance. The controller 615 also transmits a signal causing compressed air to be discharged from the brake assembly 8 to the relay circuit 616 for the electromagnetic valve 81. The electromagnetic valve 81 blocks the air passage between the compressed air supply 618 and the brake assembly 8, and discharges compressed air from the port 82 of the brake assembly 8. If the resilient force of the armature coil spring 85 overcomes the air pressure inside the brake assembly, the pair of brake shoes 86 are pressed against the piston rod 64. Thereby, the quill 41 is prevented from falling, even if there is an electric power failure.

The brake assembly will operate even in the event that the pressure of the air supplied to the air cylinder 60 is abnormally low. Abnormal lowering of air pressure is detected by a pressure switch 617 provided between the air regulator 613 and the air cylinder 60. If the controller 615 receives a detection signal from the pressure switch 617, a warning is issued and the brake assembly is caused to operate in the same way as for an electricity failure.

Figure 6:
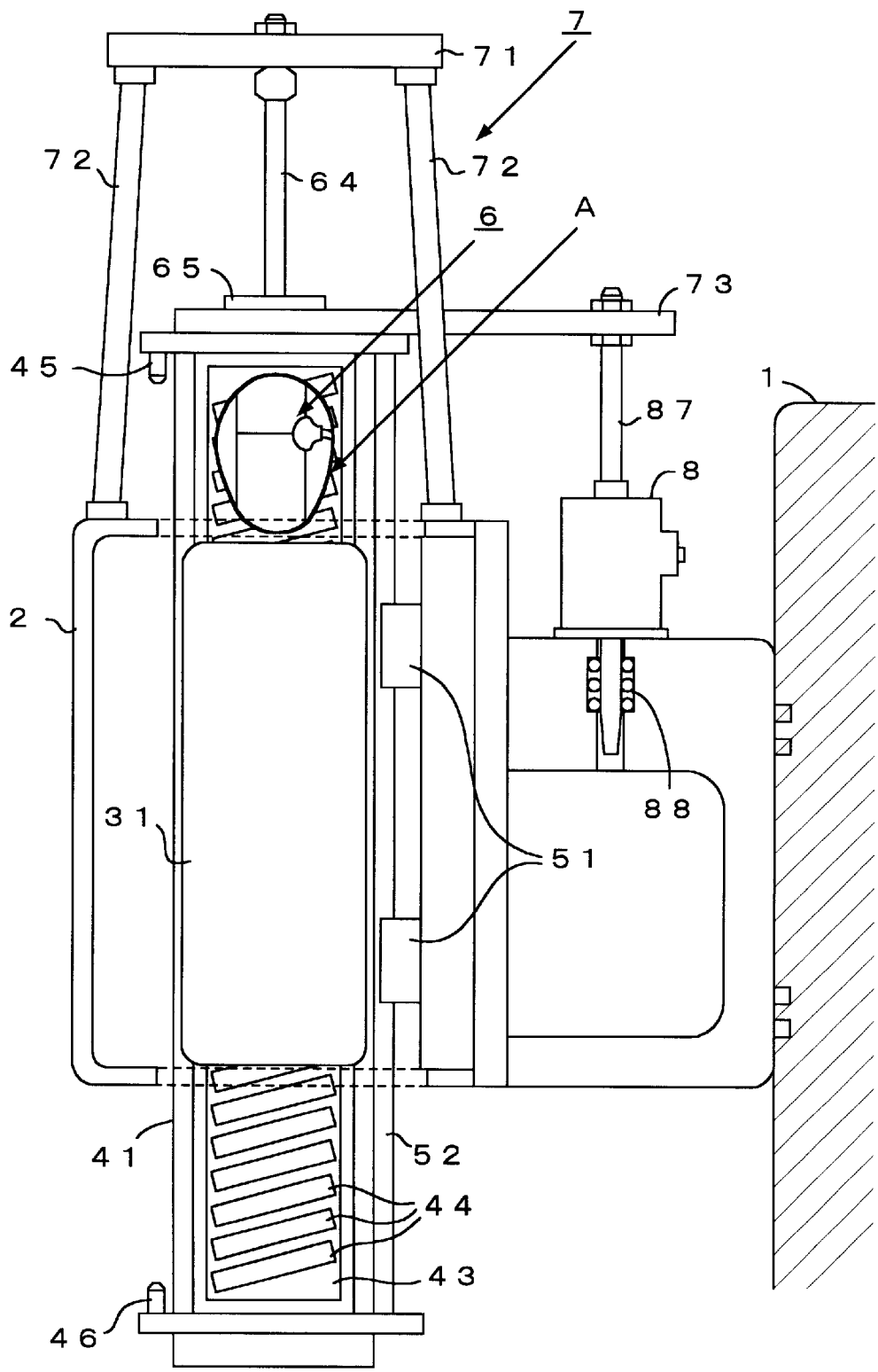
FIG. 6 is a side view illustrating a second embodiment of an electric machining discharge apparatus of the present invention.
Figure 7:
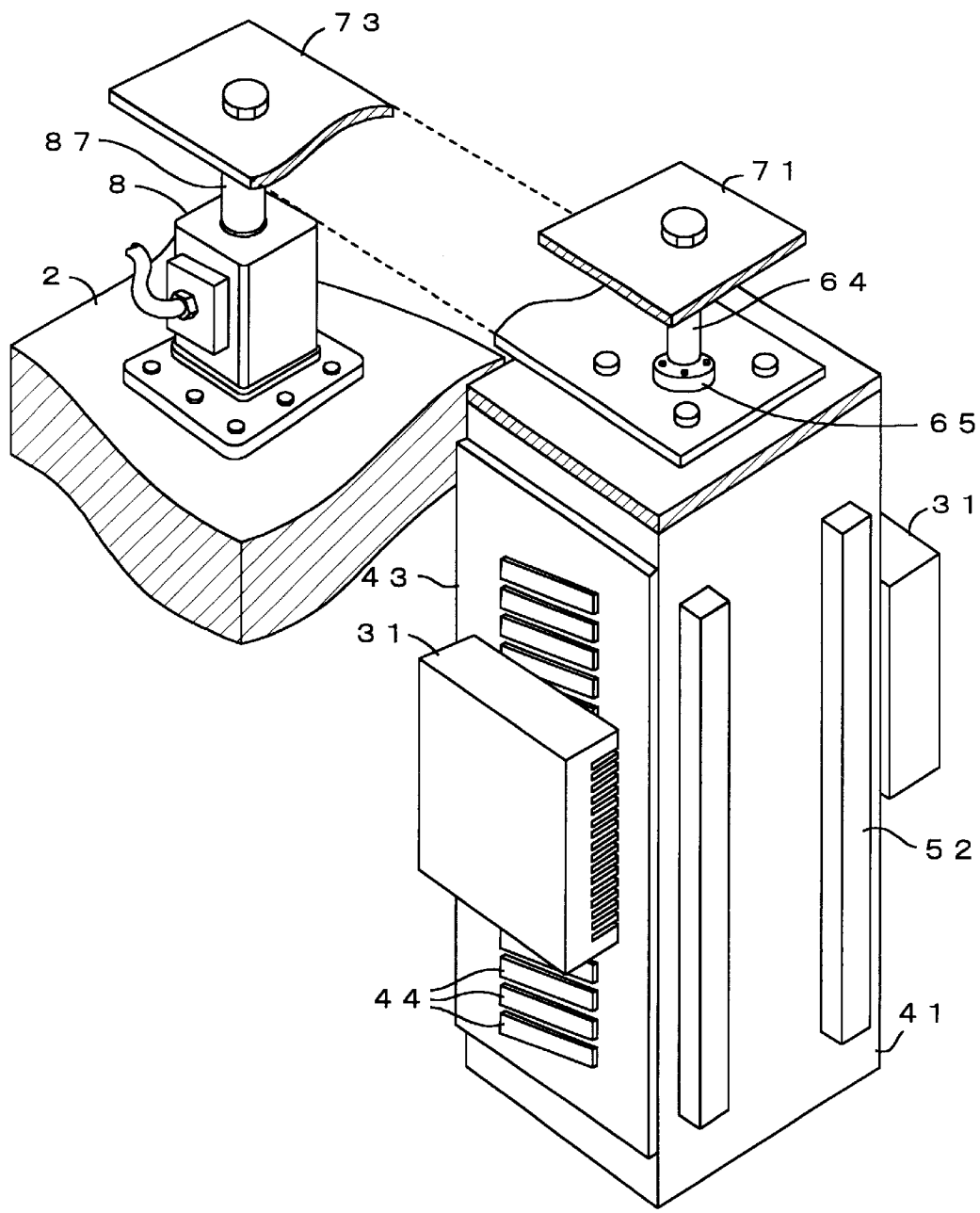
FIG. 7 is a perspective view of the electric discharge machining apparatus in FIG. 6.

Referring to FIG. 6 and FIG. 7, a second embodiment of an electric discharge machining apparatus of the present invention will now be described. Elements that are the same as those in FIG. 1, FIG. 2, FIG. 3 FIG. 4 and FIG. 5 have the same reference numerals attached thereto, and description thereof will be omitted.

The brake assembly 8 is fixed to a frame 2 between a column 1 and a quill 41. A shaft 87, moveable in a direction parallel to a piston rod 64, passes through the brake assembly 8. The movable shaft 87 is guided by a bearing 88 inserted into through holes of the frame 2. An upper end of the movable shaft 87 is connected to a upper end of the quill 41 by a horizontally extending bridge plate 73. A side wall 72 of a bracket 7 has an opening communicating with the bridge plate 73. In this embodiment, a brake assembly 8 is located at an upper section of the quill 41, which means that the height of a head section of the machine can be made small.

Figure 8:
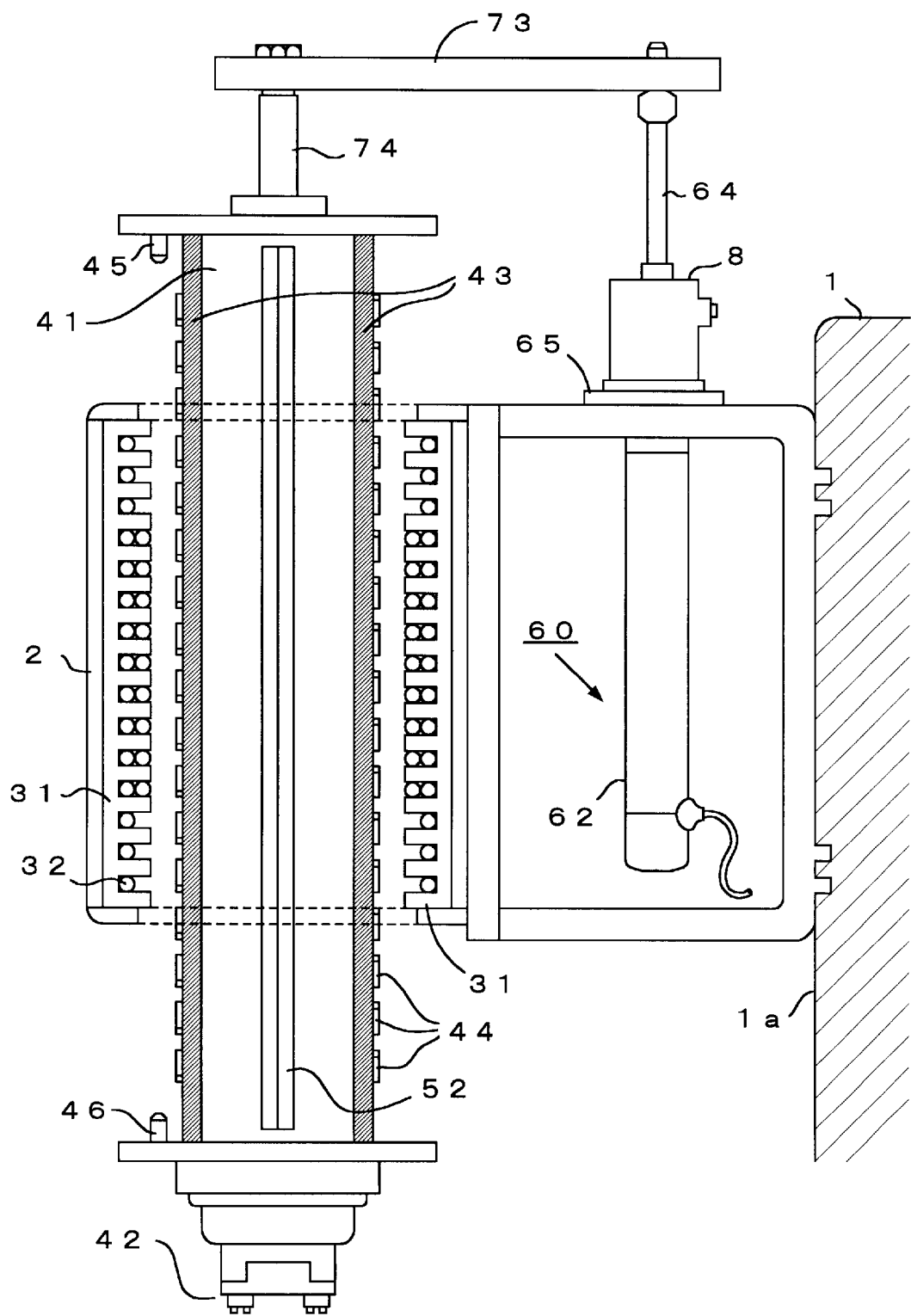
FIG. 8 is a side view illustrating a third embodiment of an electric machining discharge apparatus of the present invention.
Figure 9:
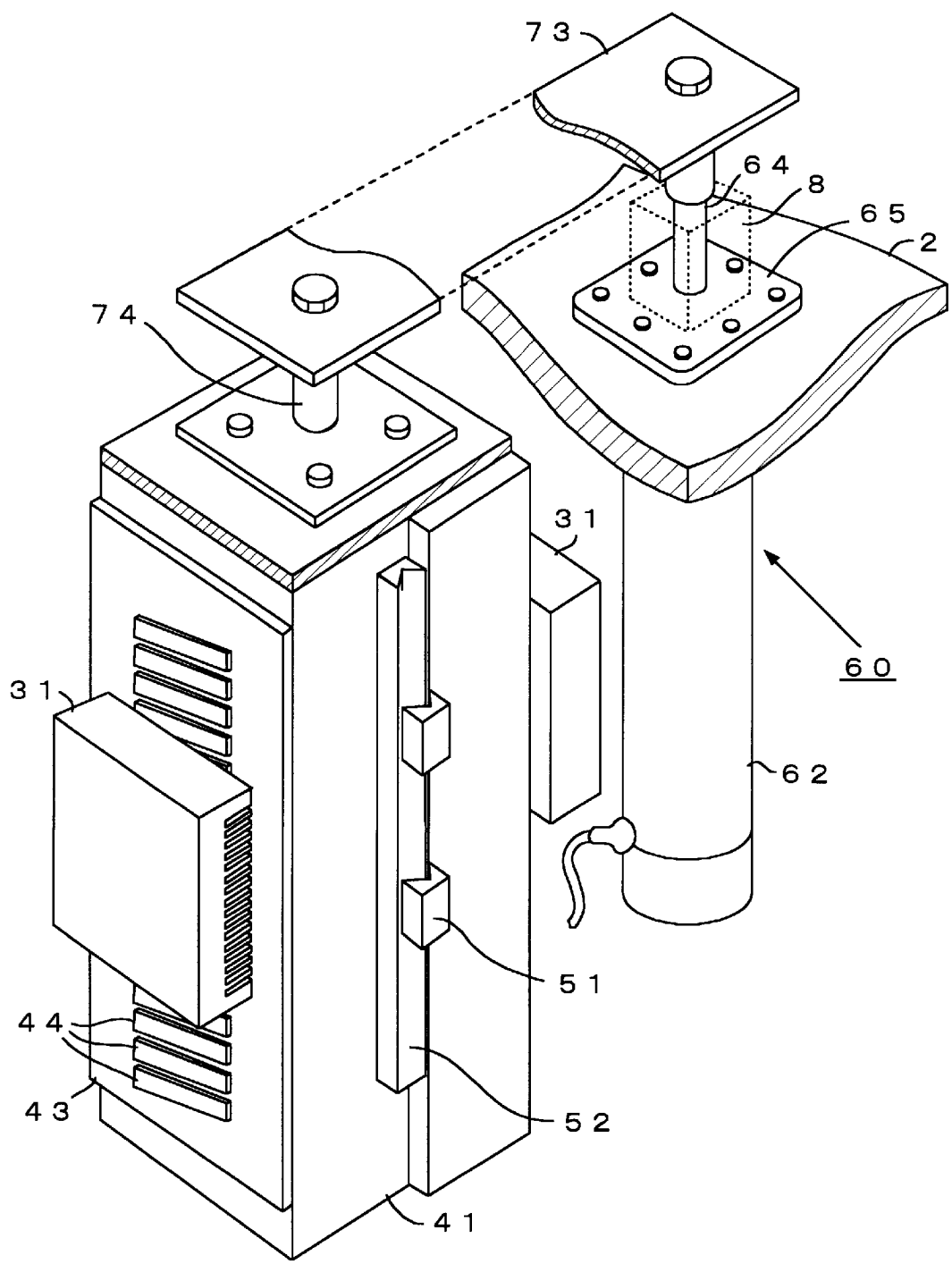
FIG. 9 is a perspective view of the electric discharge machining apparatus in FIG. 8.

Referring to FIG. 8 and FIG. 9, a third embodiment of an electric discharge machining apparatus of the present invention will now be described. Elements that are the same as those in FIG. 1, FIG. 2, FIG. 3 FIG. 4 and FIG. 5 have the same reference numerals associated therewith, and description thereof will be omitted.

Differing from the first and second embodiments, magnetic plates 43 are respectively fixed to quill side walls parallel to vertical surfaces 1a of a coil 1. However, similarly to the other embodiments, two linear motors are arranged so that the thrust center of the motors is aligned with the central axis of the quill 41. A flange 65 of an air cylinder 60 is rigidly fixed to a frame 2 with bolts so that a cylinder 62 is arranged parallel to the quill 41 between the quill 41 and a column 1. A lower end of a support rod 74 extending coaxially with the quill 41 is fixed to an upper end of the quill 41. An upper end of a piston rod 64 is connected to an upper end of the support rod 74 using a bridge plate 73 extending horizontally. In applications where it is most important to make the moving body, including the quill 41, light in weight, the air cylinder 60 and the brake assembly 8 may be removed from the moving body in this way.

Figure 10:
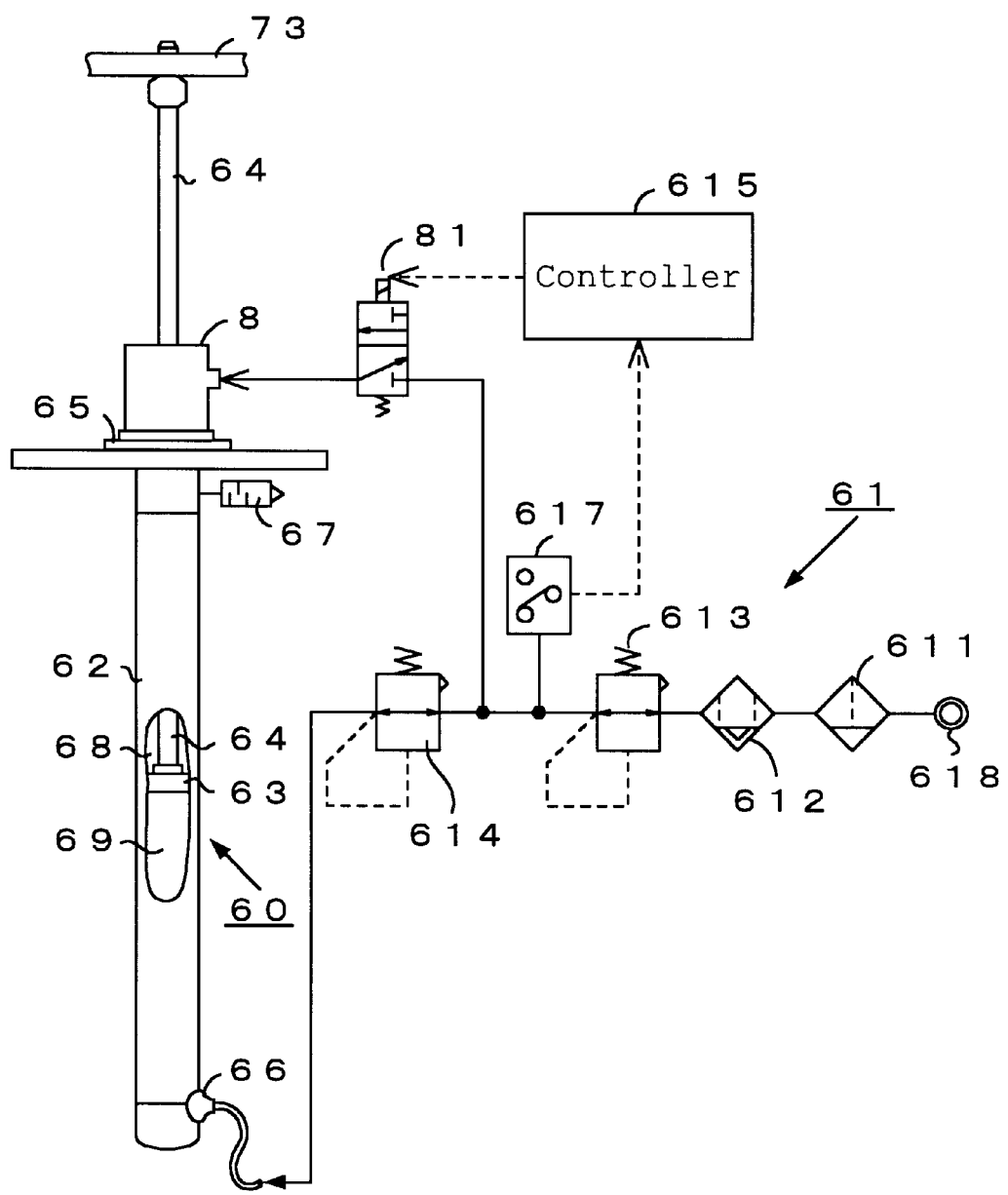
FIG. 10 is an air circuit diagram of a balance device in FIG. 9.

As shown in FIG. 10, air may be supplied either from a supply port 66 to a lower chamber 69 formed inside the cylinder 62 lower down than a piston 63, or discharged from the lower chamber 69. The amount of air inside the lower chamber 69 is controlled according to the position of the quill 41 so that the air pressure inside the lower chamber 69 is maintained at a specified value. An upper chamber 68 formed in the cylinder 62 lower than the piston 63 communicates with a silencer 67 and opens to the atmosphere.

The foregoing description of preferred embodiments of the invention have been presented for the purposes of illustration and description. They are not intended to be exhaustive or to limit the invention to the precise forms disclosed, and obviously various modifications and variations are possible in light of the above teachings. It is intended that the scope of the invention be defined by the appended claims.

What is claimed is:

1. An electric discharge machining apparatus for machining a workpiece by moving a tool electrode towards a workpiece in a vertical direction while causing electric discharge between the workpiece and the tool electrode, comprising:
    a quill movable in the vertical direction;
    an electrode mounting device for mounting the tool electrode, attached to a lower end of the quill;
    at least two linear motor movers attached to the quill symmetrical about the central axis of the quill;
    at least two linear motor stators, respectively opposite the at least two movers; and
    a balance device for balancing a gravitational force acting on the quill so that a line of action of a balance force is aligned with the central axis of the quill.

2. The electric discharge machining apparatus of claim 1, wherein the balance device comprises an air cylinder arranged coaxially with the quill.

3. The electric discharge machining apparatus of claim 2, wherein the quill has a hole extending vertically in the center, and the air cylinder is located in this hole.

4. The electric discharge machining apparatus of claim 1, wherein the balance device comprises a cylinder head fixed to and coaxial with the quill, a piston capable of reciprocating inside the cylinder, and a fixed piston rod connected to the piston.

5. The electric discharge machining apparatus of claim 4, further comprising a brake device for applying a braking force to the piston rod.

6. The device according to claim 5 wherein said brake device comprises a pair of brake shoes disposed about said piston rod and a pair of actuators for said brake shoes, and further comprising a controller, responsive to a loss of power condition to operate said actuators to operate said brake shoe to bear against said piston rod.

7. The device according to claim 6 wherein said actuators comprise a pair of levers responsive to a pneumatically operated member to open and close said brake shoes.

8. The device according to claim 7 further comprising a pneumatic circuit including a source of air and an electromagnetic valve, said electromagnetic valve being responsive to a loss of power condition to admit air from said source to operate said pneumatic member.

9. The electric discharge machining apparatus of claim 4, comprising a movable shaft extending parallel to the piston rod, a bridging plate extending horizontally for connecting the movable shaft to the quill, and a brake device for applying a braking force to the movable shaft.

10. The apparatus according to claim 4 wherein said piston defines a boundary between an upper chamber of said cylinder and a lower chamber and the amount of air in the upper chamber is controlled in response to quill position so as to maintain the pressure in said upper chamber at a generally fixed value.

11. The apparatus according to claim 10 further comprising a high speed relief valve connected to said upper chamber for supplying air to and discharging air from said upper chamber at high speed in response to movement of said quill.

12. The electric discharge machining apparatus of claim 1, wherein the tool mounting device is arranged coaxially with the quill.

13. An electric discharge machining apparatus for machining a workpiece by moving a tool electrode towards a workpiece in a vertical direction while causing electric discharge between the workpiece and the tool electrode, comprising:

a quill movable in the vertical direction;

an electrode mounting device for mounting the tool electrode, attached to a lower end of the quill;

at least two linear motor movers attached to the quill symmetrical about the central axis of the quill;

at least two linear motor stators, respectively opposite the at least two movers;

a cylinder fixed parallel to the quill;

a piston capable of reciprocating inside the cylinder;

a piston rod connected to the piston;

a support rod fixed to the quill and extending coaxially with the quill; and a bridging plate extending horizontally for connecting the piston rod and the support rod.

14. The apparatus according to claim 13 wherein said bridge plate extends horizontally between the piston rod and the support rod.

15. The apparatus according to claim 13 wherein said piston defines a boundary between an upper chamber of said cylinder and a lower chamber and the amount of air in the upper chamber is controlled in response to quill position so as to maintain the pressure in said upper chamber at a generally fixed value.

16. The apparatus according to claim 15 further comprising a high speed relief valve connected to said upper chamber for supplying air to and discharging air from said upper chamber at high speed in response to movement of said quill.

* * * * *